United States Patent
Bosscher et al.

(10) Patent No.: US 9,936,133 B2
(45) Date of Patent: Apr. 3, 2018

(54) GIMBALED CAMERA OBJECT TRACKING SYSTEM

(71) Applicant: HARRIS CORPORATION, Melbourne, FL (US)

(72) Inventors: Paul M. Bosscher, West Melbourne, FL (US); Matthew D. Summer, Melbourne, FL (US); William S. Bowman, Melbourne, FL (US); Jeffrey M. Pollard, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 359 days.

(21) Appl. No.: 14/830,023

(22) Filed: Aug. 19, 2015

(65) Prior Publication Data
US 2017/0050563 A1     Feb. 23, 2017

(51) Int. Cl.
*H04N 7/18* (2006.01)
*H04N 5/232* (2006.01)
*G01S 3/00* (2006.01)

(52) U.S. Cl.
CPC ........... *H04N 5/23261* (2013.01); *G01S 3/00* (2013.01); *H04N 5/232* (2013.01)

(58) Field of Classification Search
CPC ................................................. H04N 5/23261
See application file for complete search history.

(56) References Cited

U.S. PATENT DOCUMENTS

| | | | |
|---|---|---|---|
| 7,636,452 B2 | 12/2009 | Kamon | |
| 8,174,580 B2 | 5/2012 | Hayashi | |
| 2006/0028548 A1* | 2/2006 | Salivar | G08B 13/19643 348/143 |
| 2006/0215027 A1* | 9/2006 | Nonoyama | G01C 11/00 348/144 |
| 2012/0212622 A1 | 8/2012 | Nakamura et al. | |
| 2013/0162822 A1 | 6/2013 | Lee et al. | |
| 2014/0336848 A1* | 11/2014 | Saund | G08G 1/054 701/3 |

OTHER PUBLICATIONS

Automatic Tracking System ensures cameras follow presenters, Apr. 18, 2014 (7 pages) http://news.thomasnet.com/fullstory/automatic-tracking-system-ensures-cameras-follow-presenters-20025379.

(Continued)

*Primary Examiner* — Tracy Y Li
(74) *Attorney, Agent, or Firm* — Fox Rothschild LLP; Robert J. Sacco; Carol E. Thorstad-Forsyth

(57) ABSTRACT

A system for automatically controlling a gimbaled camera system of a vehicle. The system includes a camera positioned relative to a body of the vehicle and one or more sensors configured to sense the pointing direction of the camera. One or more sensors are configured to monitor movement of the vehicle relative to a surface. A processor is configured to receive the sensed camera pointing direction data and vehicle movement data. The processor establishes and stores a target position representative of the position of a target object relative to the vehicle body based on an object independent association and automatically adjusts the camera pointing direction in response to the vehicle movement data such that the camera remains aimed on the target position. A method for automatically controlling the gimbaled camera system is also provided.

18 Claims, 6 Drawing Sheets

(56) References Cited

OTHER PUBLICATIONS

Dynamic target tracking camera system keeps its eye on the ball, Jun. 18, 2013 (5 pages) http://www.diginfo.tv/v/13/0049-r-en-php.
Mir-Nasiri, Nazim, Camera-based 3D Object Tracking and Following Mobile Robot, IEEE, RAM 2006, pp. 375-380.
Move 'N See, Your Personal Robot Cameraman for Indoor and Outdoor shooting (3 pages), www.movensee.com/home.
Witecki, Michael (posted by), Cutting Edge Technology: Camera Control Tracking using Sound Source Location (SSL), Oct. 8, 2012 (7 pages), https://teecom.com/author/michael-w/.

* cited by examiner

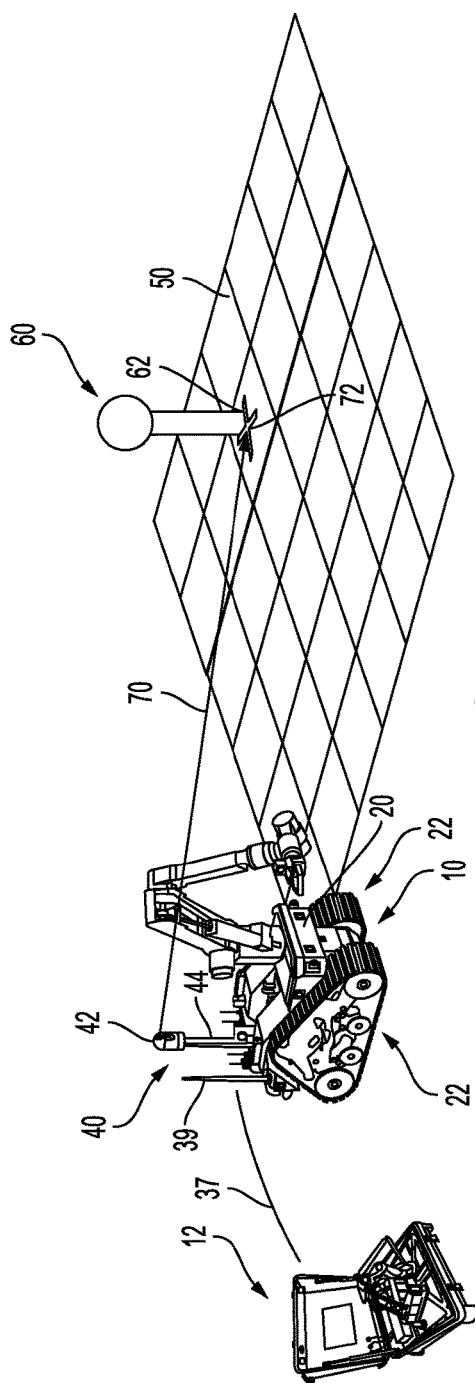

GIMBALED CAMERA OBJECT TRACKING SYSTEM

FIELD OF THE INVENTION

This invention relates to unmanned vehicles. More particularly, the invention relates to systems and methods which facilitate auto-tracking of a gimbaled camera of the unmanned vehicle.

BACKGROUND OF THE INVENTION

Unmanned ground vehicles (UGVs) are used to an increasing extent both for non-military and military purposes. Remotely-controlled and remotely-guided unmanned vehicles (such as UGVs) are in widespread use in applications such as Explosive Ordinance Disposal ("EOD"), search and rescue operations, hazardous material disposal, surveillance, etc. Such a vehicle has a pan/tilt/zoom camera mounted on it which transmits images to an operator. The images are often used for reconnaissance purposes, for example, examination of an object of interest. The operator watches the images on a display and operates the vehicle using a control unit. The control unit has a joystick with which the operator steers the vehicle forward/backward and right/left. Typically, there is an additional joystick with which the operator steers the camera up/down/right/left relative to the vehicle.

A common method of teleoperating an unmanned vehicle is the case where the operator controls, with one joystick of the control unit, the movements of the vehicle in space and, with the other joystick, the movement of the camera relative to the vehicle. The drawback of this method is that an experienced operator is required to steer both the vehicle and the camera at the same time, especially in high stress situations. This drawback is due to the fact that the operator must take into consideration the orientation of the camera, the orientation of the vehicle and also the difference between them when the vehicle is to be operated.

While automated camera tracking systems have been developed, they are often too complex, too expensive and/or ineffective.

Accordingly, there is a need for a system and method to automatically track objects/locations in the environment with the gimbaled camera without requiring additional sensors.

SUMMARY OF THE INVENTION

In at least one embodiment, the invention provides a system for automatically controlling a gimbaled camera system of a vehicle. The system includes a camera positioned relative to a body of the vehicle and one or more sensors configured to sense the pan and tilt orientation of the camera. One or more sensors are configured to monitor movement of the vehicle relative to a surface. A processor is configured to receive the sensed pan and tilt orientation data and vehicle movement data. The processor establishes and stores a target position representative of the position of a target object relative to the vehicle body based on an object independent association and automatically adjusts the pan and tilt of the camera in response to the vehicle movement data such that the camera remains aimed at the target position.

In at least one embodiment, the invention provides a method for automatically controlling a gimbaled camera system of a vehicle comprising: manually aiming a camera of the gimbaled camera system at a target object; activating the auto-tracking mode of the camera; establishing a target position through an object independent association between a location of the camera and the target object; storing the target position; monitoring movement of the vehicle relative to the position of the vehicle when the target position was established; and automatically adjusting the pan and tilt of the camera in response to movement of the vehicle such that the pointing direction of the camera remains on the target position.

In at least one embodiment, the step of establishing a target position through an object independent association between a location of the camera and the target object may comprise aiming the camera at a first point whereat the target object intersects the surface and determining a first target location representative of the first point based on the pan and tilt orientation data when the camera is aimed at the first point.

In at least one embodiment, the step of establishing a target position through an object independent association between a location of the camera and the target object may comprise aiming the camera at a first point on the target object when the vehicle is in a first stationary position and storing the pan and tilt orientation data representative of the first stationary position; moving the vehicle to a second stationary position and aiming the camera at the first point on the target object and storing the pan and tilt orientation data representative of the secondary stationary position and movement data representative of the movement from the first stationary position to the second stationary position; and establishing the first point as the target position based on a comparison of the pan and tilt orientation data representative of the first stationary position, the pan and tilt orientation data representative of the second stationary position and the movement data representative of the movement from the first stationary position to the second stationary position.

In at least one embodiment, the step of establishing a target position through an object independent association between a location of the camera and the target object may comprise aiming the camera at a first point on the target object when the vehicle is in a stationary position and storing the pan and tilt orientation data representative of the stationary position; directing a beam of a LIDAR unit substantially co-linear with the camera at the first point and determining a distance between the camera and the first point based on a reflected beam received by the LIDAR unit; and establishing first point as the target position based on the pan and tilt orientation data representative of the stationary position and the determined distance.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIGS. 3-5 are isometric views of a UGV in accordance with an embodiment of the invention illustrating acquisition of a target position using an exemplary method of object independent association and tracking of the object thereafter.

DETAILED DESCRIPTION OF THE INVENTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Figure 1:
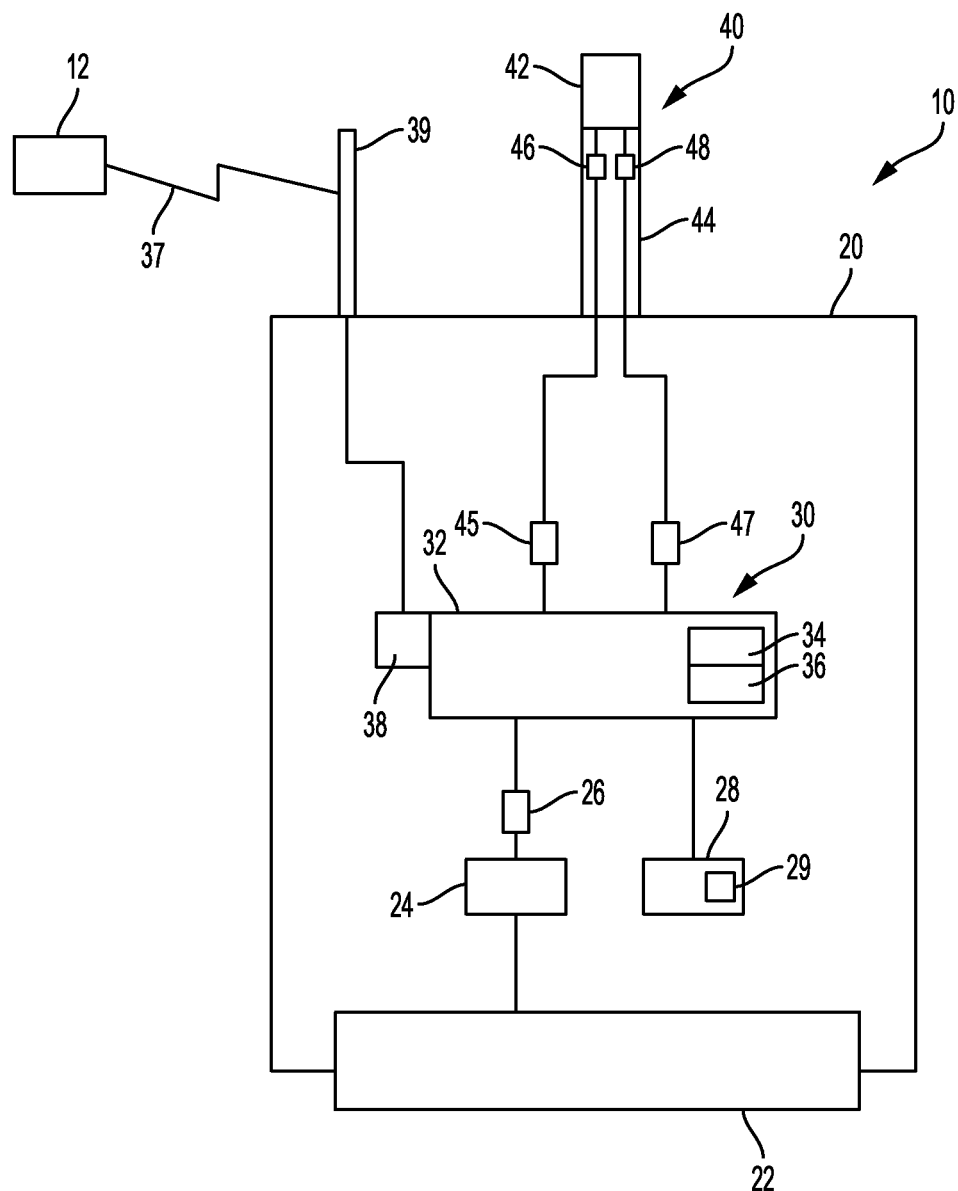
FIG. 1 is a schematic diagram of a UGV incorporating an object tracking system in accordance with an embodiment of the invention.

Referring to FIG. 1, a UGV 10 in accordance with an exemplary embodiment of the invention. The schematic illustration of the UGV 10 shown in FIG. 1 is not drawn to scale. While the invention is described herein with respect to a UGV, the invention is not limited to such and may be used with any unmanned vehicle with a gimbaled camera, for example, an unmanned aerial vehicle (UAV) or an unmanned underwater vehicle (UUV).

The UGV 10 is a motorized vehicle that operates without an on-board human presence. The UGV 10 can be used in various applications, such as EOD applications, search and rescue applications, hazardous material disposal applications, and/or surveillance applications. The UGV 10 can be remotely controlled using a control unit 12. In this regard, the control unit 12 enables a user's control of the UGV's operations and movement from a remote location.

The UGV 10 includes a body 20 typically comprising a rigid chassis 202. The UGV 10 also includes drive elements 22 which may be in various forms, for example, front and rear wheels, opposed side tracks, or articulating legs. One or more reversible electric motors 24 or the like is mounted on the body 20 and is configured to drive the drive elements 22. The control unit 12 is configured to control the motors 24 to in turn actuate the drive elements 22 to facilitate movement of the UGV 10. A sensor 26 may be associated with the motors 24 to monitor the actuation of the drive elements 22 to determine the movement of the UGV 10. Additionally or alternatively, an inertial measurement unit (IMU) 28 may be utilized to monitor the movement of the UGV 10. The IMU 28 may include various sensors 29 may also include but are not limited to, inclinometers, Attitude and Heading Reference Sensors ("AHRS"), accelerometers, gyroscopes, magnetometers, inertial reference sensors and Global Positioning System ("GPS") sensors. The IMU 28 operates in a known manner to monitor the movement of the UGV.

The UGV 10 further includes a controller 30. The controller 30 comprises a processor 32 (e.g., a Central Processing Unit ("CPU")), a main memory 34 and a static memory 36. The static memory 36 stores one or more sets of instructions (e.g., software code). The instructions implement one or more of the methodologies, procedures, or functions described herein. The instructions can also reside, completely or at least partially, within the main memory 34 or the processor 32 during execution thereof thereby. The main memory 34 and the processor 32 also can constitute machine-readable media.

The UGV 10 includes a transceiver 38 communicatively coupled to the processor 32. The transceiver 38 communicates with the control unit 12 via a wireless communication link 37 (e.g., a Radio Frequency ("RF") transmission). One or more antennas 39 is provided to facilitate the transmission and reception of information to and from the transceiver 38 of the UGV 10.

A gimbaled camera assembly 40 is supported by the body 20. In the illustrated embodiment, the camera 42 is supported on a mast 44 extending from the body 20. A first motor 46 is associated with the camera 42 to control pan movement of the camera 42 while a second motor 48 is associated with the camera 42 to control tilting thereof. The camera 42 may be further configured for zoom control as is known in the art. Each of the motors 46, 48 is associated with a respective sensor 45, 47 configured to sense the operation of the motors 46, 48 to determine the direction the camera 42 is aiming, i.e. the pan and tilt of the camera. In some instances, the mast 44 may be of an adjustable variety, wherein the system would include another sensor (not shown) configured to sense the position (height) of the camera 42 relative to the body 20. The information from the various sensors 26, 28 45, 47, which are common sensors to a UGV, are provided to the processor 32 and are utilized thereby to determine a target position and thereafter adjust the camera 42 to maintain pointing of the camera on the target position as the UGV is moved, as will be described in more detail hereinafter.

Figure 2:
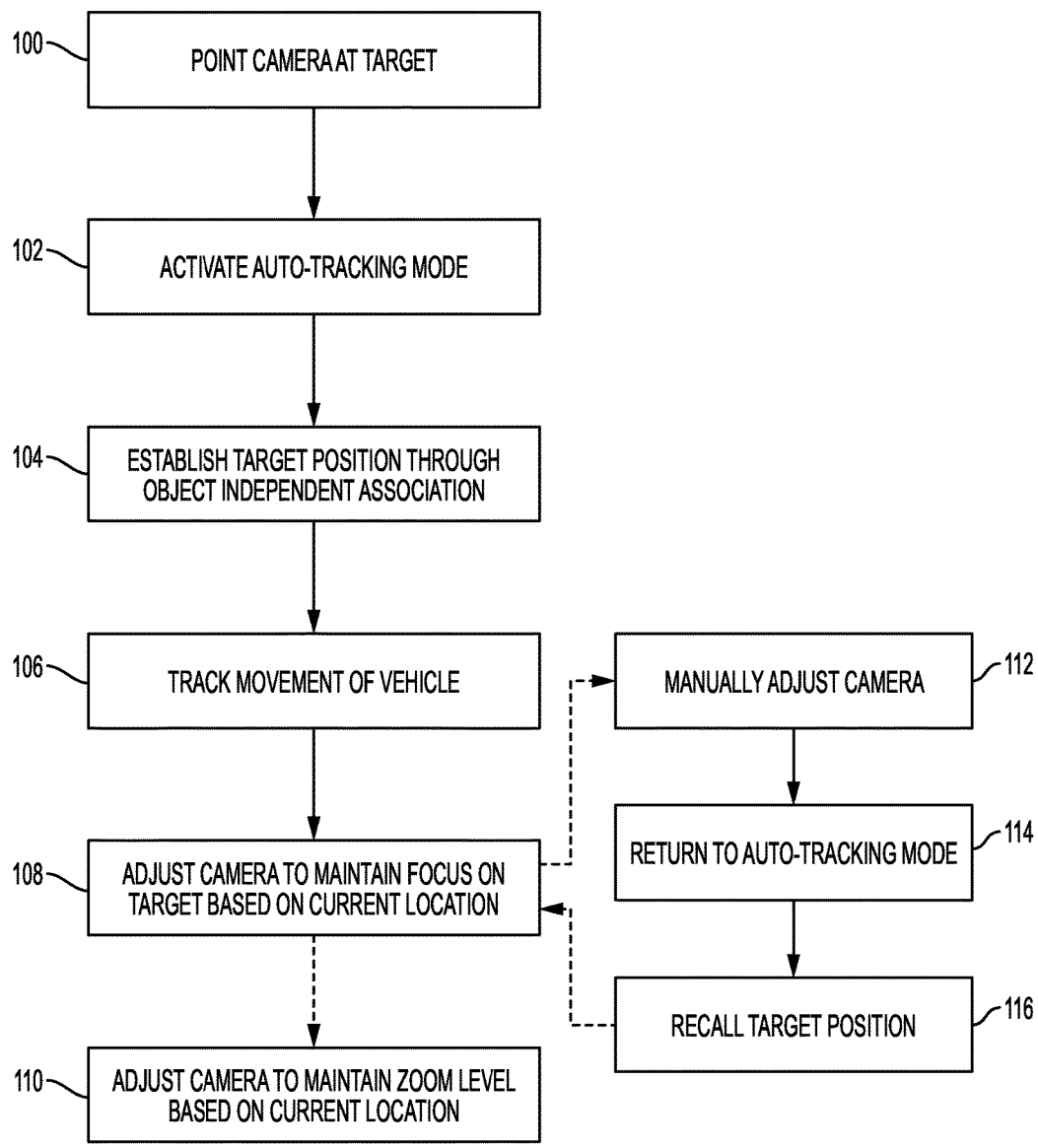
FIG. 2 is a flow diagram of an exemplary method of automatically tracking an object of interest in accordance with an embodiment of the invention.

Referring to FIG. 2, a method of auto-tracking the camera 42 of the UGV 10 on a target position will be described. In a first step 100, the user utilizes the control unit 12 to manually point the camera 42 at the target object. In step 102, the user utilizes the control unit 12 to activate the auto-tracking mode of the camera 42. Such activation signals the processor 32 to enter the auto-tracking mode and to move to step 104 whereat the processor establishes the target position through an object independent association and stores the target position in memory 34 or 36. By object independent association, it is meant that the target position is established without requiring a target element to be applied to the target object or for the system to require specialized equipment, e.g. machine vision, which requires the system to recognize and determine what the target object is so that it can distinguish the object from its surroundings.

Once the target position has been established, the user is free to move the UGV 10 in any desired manner. In step 106, the movement of the vehicle relative to the position of the vehicle when the target position was established is tracked. As explained above, the movement may be tracked through the sensors 26 and 28 or by other means of tracking vehicle movement. As the UGV 10 is moved, the processor 32 is configured at step 108 to adjust the pan and tilt of the camera 42 using motors 46, 48 based on the current location of the UGV such that the aim of the camera 42 remains on the target position. Optionally, the processor 32 may further be configured to adjust the zoom level of the camera 42 based on the current location of the UGV such that a substantially constant zoom on the target object is maintained, i.e. the target object continues to fill the same percentage of the screen. For example, if the UGV 10 is moved closer to target object, the zoom level may be decreased and vice versa.

As further optional steps 112-116 illustrate, the system and method may further be configured to allow the user to override the auto-tracking mode and then return to auto-tracking mode simply by reactivating such. In step 112, the user manually adjusts the pan and/or tilt of the camera 42 using the control unit 12. For example, the user may want to get a better look at the environment surrounding the target object. Once the need for manual control is over, the user would utilize the control unit 12 to reactivate auto-tracking mode as indicated in step 114. Upon receiving the reactivation signal, the processor 32 moves to step 116 whereat the processor 32 recalls the stored target position and then returns to step 108 whereat the camera 42 is automatically adjusted to aim at the target position based on the current location of the UGV 10.

Having described the general components of the system and the general method of operations, a first exemplary method of establishing the target position through an object independent association will be described with respect to FIGS. 3-5. Referring to FIG. 3, the UGV 10 is positioned on a surface 50 at a distance from the target object 60. With the UGV 10 stationary, the user utilizes the control unit 12 to aim the camera 42 such that the aim thereof, as indicated by arrow 70, is at the point 72 where the base 62 of the object of interest 60 meets the surface 50. Since the UGV 10 is not moving and the height of the camera 42 relative to the surface 50 is known, assuming that the surface 50 is relatively flat, the processor 32 utilizes an algorithm to determine the position of the point 72 relative to UGV 10 based on the pan direction of the camera 42 and the tilt of the camera 42. For example, the algorithm may be configured such that for a given camera height, a given pan direction and a given tilt angle, the UGV 10 is a specific distance from the point 72 on the surface 50. Such algorithm may be established based upon mathematic modeling or through a lookup table in which various combinations of height, pan and tilt are associated with a given distance between the UGV 10 and the point 72.

The point 72 may be established as the target position. Alternatively, another point on the target object 60 which is substantially co-planar with the point 72 in an X-Y plane perpendicular to the ground surface may be established as the target position by determining an X/Y offset. Referring to FIG. 4, if the user would like to optionally establish a second point 84 as the target position, the user would then aim the camera 42 at the second position 74 and signal through the control unit 12 that the currently aimed at target 74, as indicated by arrow 73, is to be utilized as the target position. The processor 32 then uses the feedback from the sensors 45, 47 to establish the X and Y change in the camera 42 and therefrom calculates the target position 74 by adding the offset to the originally established position 72.

Figure 5:
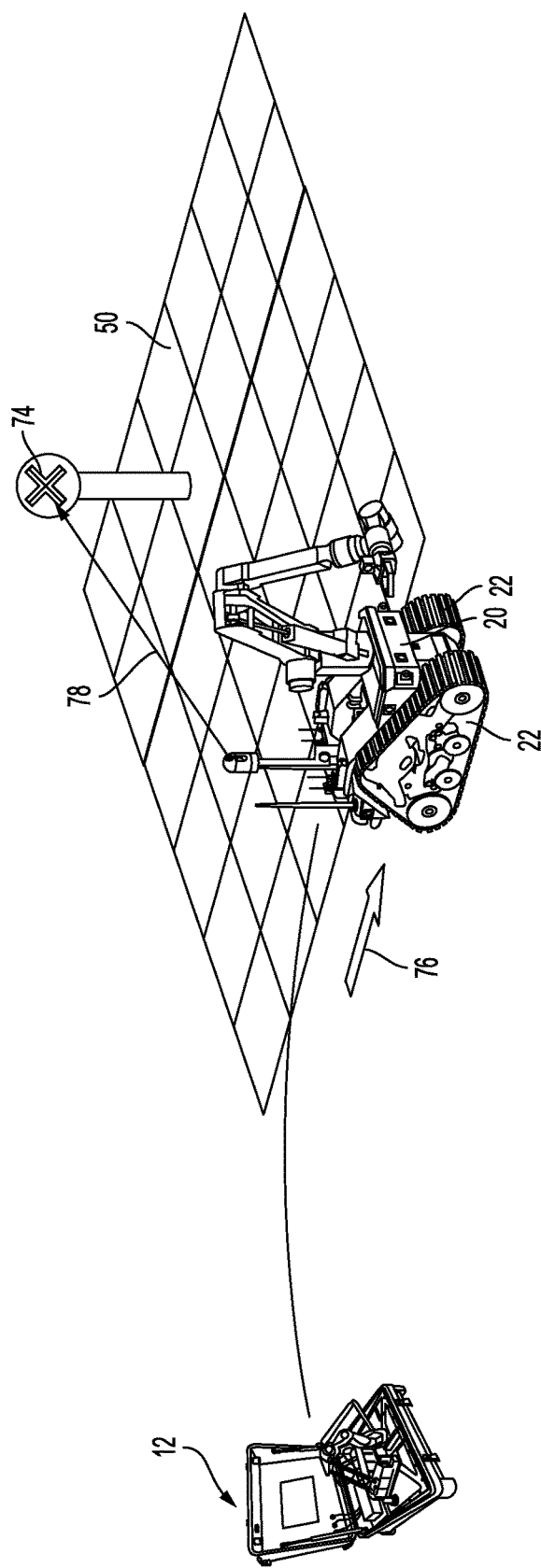

FIG. 5 illustrates movement of the UGV 10 as indicated by arrow 76. As explained above, such movement of the UGV 10 is tracked by the sensor 26 and/or 28. The processor 32 receives such movement data and automatically adjusts the pan and tilt of the camera 42 to compensate for such movement and maintain the camera 42 aimed on the target position 74.

Figure 6:
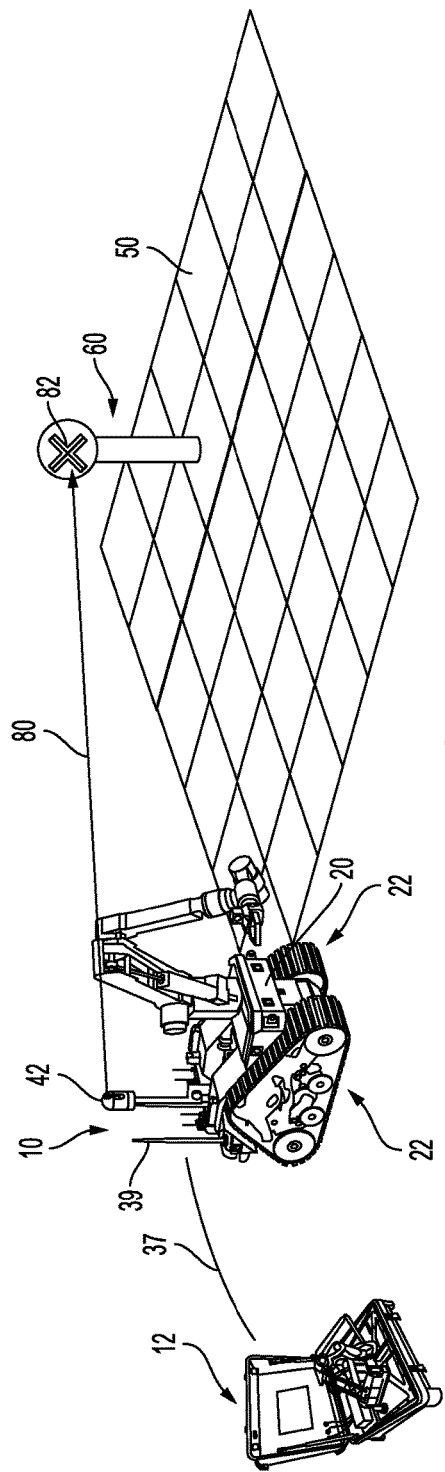
FIGS. 6-7 are isometric views of a UGV in accordance with an embodiment of the invention illustrating acquisition of a target position using another method of object independent association.
Figure 7:
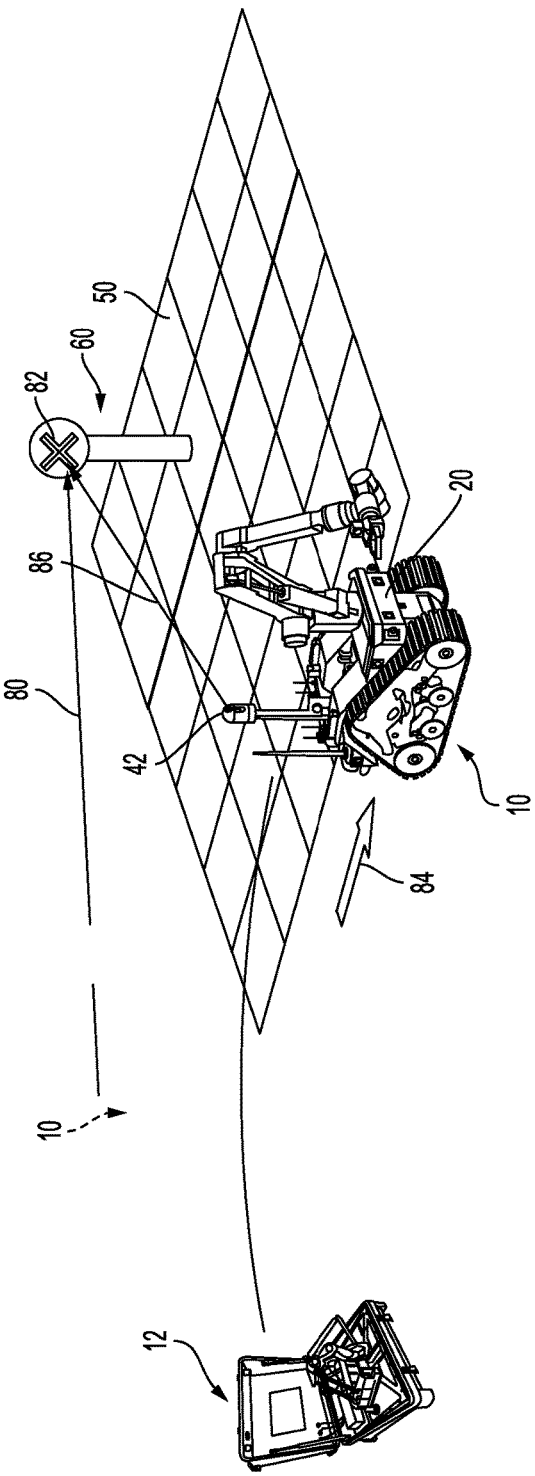

Referring to FIGS. 6 and 7, another exemplary method of establishing the target position through an object independent association will be described. With reference to FIG. 6, the UGV 10 is positioned on a surface 50 at a distance from the target object 60. With the UGV 10 stationary, the user utilizes the control unit 12 to aim the camera 42 such that the aim thereof, as indicated by arrow 80, is at the target position 82 on the object of interest 60. The pan and tilt of the camera 42 at this first position of the UGV 10 is stored in memory 34/36. The UGV 10 is then moved to a second position as indicated by arrow 84 in FIG. 7. The movement of the UGV 10 is sensed by the sensors 26 and/or 28 and stored. With the UGV 10 stationary in the second position, the user utilizes the control unit 12 to again aim the camera 42 such that the aim thereof, as indicated by arrow 86, is at the same target position 82 on the object of interest 60. The pan and tilt of the camera 42 at this second position of the UGV 10 is stored in memory 34/36. The processor 32 then uses the stored information, i.e. pan/tilt representative of arrow 80, movement representative of arrow 84 and pan/tilt representative of arrow 86. With this information, the processor 32 utilizes triangulation or other mathematical modelling to establish the target position 82 and store such in memory. If the lines 80 and 84 do not intersect, the target position is estimated as the midpoint of the line segment representing the shortest distance between the two lines. Since the measurements are not dependent on intersection with the surface 50, the current method does not require that the surface be substantially flat. With the target position established, the processor 32 may automatically adjust the pan/tilt of the camera 42 in response to sensed movement of the UGV 10 as explained above.

Figure 8:
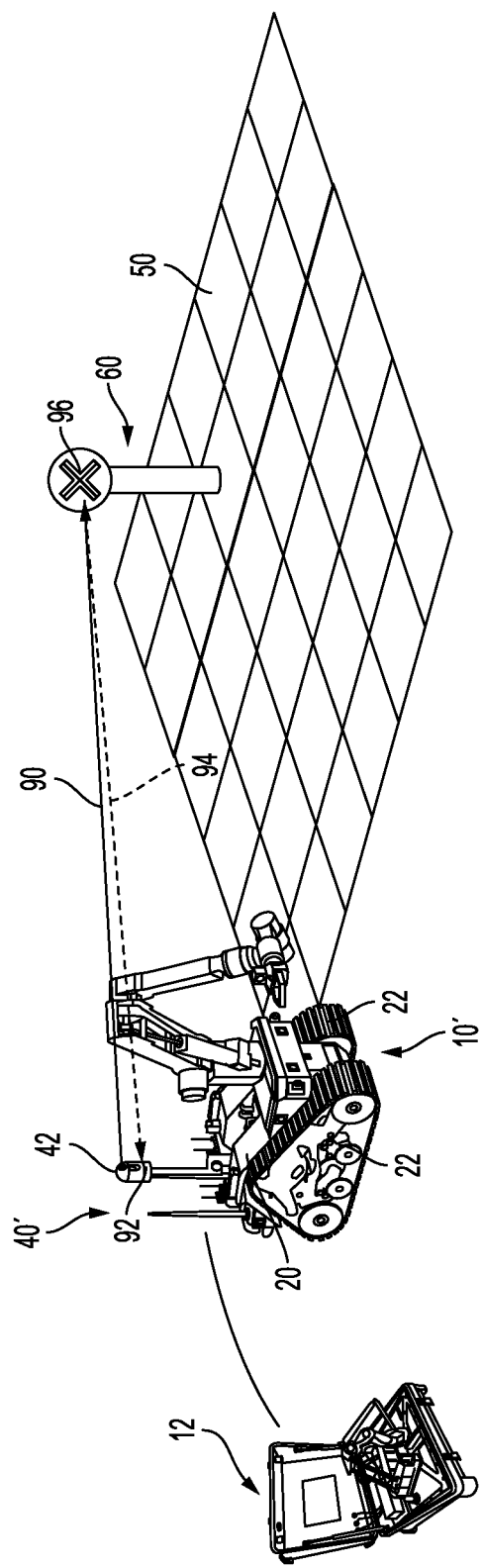
FIG. 8 is an isometric view of a UGV in accordance with an embodiment of the invention illustrating acquisition of a target position using another method of object independent association.

Referring to FIG. 8, another exemplary method of establishing the target position through an object independent association will be described. The UGV 10 is positioned on a surface 50 at a distance from the target object 60. With the UGV 10 stationary, the user utilizes the control unit 12 to aim the camera 42 such that the aim thereof, as indicated by arrow 90, is at the target position 96 on the object of interest 60. The pan and tilt of the camera 42 at this first position of the UGV 10 is stored in memory 34/36. In the current embodiment, the camera assembly 40' includes a LIDAR unit 92 positioned on the camera 42 such that the laser, as indicated by arrow 94, is beamed in substantially the same direction as the aim of the camera 42. The LIDAR unit 92 tracks the timing of the laser 94 reflecting off of the target position 96 and returning to the LIDAR unit 92. From this information, the distance between the camera 42 and the target position 96 may be determined. The processor 32 then uses the stored information, i.e. pan/tilt representative of arrow 90 and the determined distance to establish the target position 96 and store such in memory. Since the measurements are not dependent on intersection with the surface 50, the current method does not require that the surface be substantially flat. With the target position established, the processor 32 may automatically adjust the pan/tilt of the camera 42 in response to sensed movement of the UGV 10 as explained above.

While the various methods of establishing the target position through an object independent association have been described independently, it is recognized that the processor of a given UGV may be configured to select between one or more of the methods, thereby providing the UGV 10 with greater auto-tracking flexibility.

The systems and methods described herein provide automatic camera tracking of a target with minimal sensing required. Furthermore, it is much less likely that the system will be "spoofed" by changes in lighting/environment. Additionally, the automatic tracking results in a significant reduction in operator workload.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

What is claimed is:

1. A system for automatically controlling a gimbaled camera system of a vehicle, comprising:
   a camera positioned relative to a body of the vehicle;
   one or more sensors configured to sense the pointing direction of the camera;
   one or more sensors configured to monitor movement of the vehicle relative to a surface; and
   a processor configured to
      receive first sensed pan and tilt orientation data acquired when the camera was aimed at a first point on or adjacent to a target object while the vehicle was at a first stationary position, receive second sensed pan and tilt orientation data acquire when the camera was aimed at the first point while the vehicle was at a second stationary position, and vehicle movement data representative of the vehicle's movement from the first stationary position to the second stationary position,
      use vehicle movement data and the first and second sensed pan and tilt orientation data to establish a target position representative of the position of the target object relative to the vehicle body based on an object independent association, and
      automatically adjust the pointing direction of the camera in response to the vehicle's movement such that the camera remains aimed on the target position.

2. The system of claim 1, wherein
   the first point is a point which the target object intersects the surface, and
   the processor is further configured to determine a first target location representative of the first point based on the pointing direction data when the camera is aimed at the first point.

3. The system of claim 2, wherein the first target location is established as the target position.

4. The system of claim 2, wherein
   the object independent association further includes aiming the camera at a second point on the target object which is substantially co-planar with the first point in a plane perpendicular to the surface, and
   the processor is further configured to establish the second point as the target position based on an offset in the camera pointing direction data from the second point compared to the first point.

5. The system of claim 1, wherein the processor:
   stores camera pointing direction data representative of the first stationary position, while a beam of a LIDAR unit substantially co-linear with the camera is directed at the first point such that the processor determines a distance between the camera and the first point based on a reflected beam received by the LIDAR unit; and
   establishes and stores the first point as the target position based on the camera pointing direction data representative of the first stationary position and the determined distance.

6. The system of claim 1, wherein the one or more sensors configured to monitor movement of the vehicle relative to the surface includes an Inertial Measurement Unit ("IMUD").

7. The system of claim 1, wherein the vehicle includes one or more drive elements and the one or more sensors configured to monitor movement of the vehicle relative to the surface includes a sensor configured to monitor movement of the one or more drive elements.

8. The system of claim 1, wherein the processor is further configured to override the automatic adjustment of the camera based on a received override signal and to return to automatic adjustment of the camera to aim on the target position based on a current position of the vehicle based on receipt of a reactivation signal.

9. The system of claim 1, wherein the processor is further configured to automatically adjust a zoom of the camera based on a current position of the vehicle such that the object remains at a generally constant size in a field of view of the camera.

10. A system for automatically controlling a gimbaled camera system of a vehicle comprising:
    a camera positioned relative to a body of the vehicle;
    one or more sensors configured to sense the pointing direction of the camera;
    one or more sensors configured to monitor movement of the vehicle relative to a surface; and
    a processor configured to receive the sensed pan and tilt orientation data and vehicle movement data, wherein the processor establishes and stores a target position representative of the position of a target object relative to the vehicle body based on an object independent association;

and automatically adjusts the pointing direction of the camera in response to the vehicle movement data such that the camera remains aimed on the target position;
wherein the object independent association includes
aiming the camera at a first point on the target object when the vehicle is in a first stationary position such that the processor stores the camera pointing direction data representative of the first stationary position, and
moving the vehicle to a second stationary position and aiming the camera at the first point on the target object such that the processor stores the camera pointing direction data representative of the secondary stationary position and the movement data representative of the movement from the first stationary position to the second stationary position; and
wherein the processor is configured to establish and store the first point as the target position based on a comparison of the camera pointing direction data representative of the first stationary position, the camera pointing direction data representative of the second stationary position, and the movement data representative of the movement from the first stationary position to the second stationary position.

11. The system of claim 10, wherein the processor is further configured such that if a first line representative of the camera pointing direction data representative of the first stationary position and a second line representative of the camera pointing direction data representative of the second stationary position do not intersect, the target position is estimated as the midpoint of a line segment representing the shortest distance between the first and second lines.

12. A method for automatically controlling a gimbaled camera system of a vehicle, comprising:
manually aiming a camera of the gimbaled camera system at a first point on or adjacent to a target object while the vehicle is at a first stationary position;
generating first camera pointing direction data while the camera is aimed at the first point and the vehicle is at the first stationary position;
manually aiming the camera at the first point while the vehicle is at a second stationary position;
generating second camera pointing direction data while the camera is aimed at the first point and the vehicle is at the second stationary position;
obtaining vehicle movement data representative of the vehicle's movement from the first stationary position to the second stationary position;
activating the auto-tracking mode of the camera;
using the first camera pointing direction data, the second camera pointing direction data, and the vehicle movement data to establish a target position through an object independent association between a location of the camera and the target object;
storing the target position;
monitoring movement of the vehicle relative to the position of the vehicle when the target position was established; and
automatically adjusting the pointing direction of the camera in response to movement of the vehicle such that the aim of the camera remains on the target position.

13. The method of claim 12, further comprising automatically adjusting the zoom level of the camera in response to movement of the vehicle such that a substantially constant zoom on the target object is maintained.

14. The method of claim 12, further comprising:
adjusting the pointing direction of the camera in response to a manual override signal;
recalling the stored target position upon receipt of an automatic tracking reactivation signal; and
automatically adjusting the pan and tilt of the camera based on a current position of the vehicle such that the aim of the camera remains on the target position.

15. The method of claim 12, wherein:
the first point is a point at which the target object intersects the surface; and
a first target location is determined which is representative of the first point based on the first camera pointing direction data when the camera is aimed at the first point.

16. The method of claim 15, further comprising:
aiming the camera at a second point on or adjacent to the target object which is substantially co-planar with the first point in a plane perpendicular to the surface; and
establishing the second point as the target position based on an offset in the camera pointing direction data from the second point compared to the first point.

17. The method of claim 12, further comprising:
directing a beam of a LIDAR unit substantially co-linear with the camera at the first point;
determining a distance between the camera and the first point based on a reflected beam received by the LIDAR unit; and
establishing the first point as the target position based on the first camera pointing direction data.

18. A method for automatically controlling a gimbaled camera system of a vehicle comprising:
manually aiming a camera of the gimbaled camera system at a target object;
activating the auto-tracking mode of the camera;
establishing a target position through an object independent association between a location of the camera and the target object;
storing the target position;
monitoring movement of the vehicle relative to the position of the vehicle when the target position was established; and
automatically adjusting the pointing direction of the camera in response to movement of the vehicle such that the aim of the camera remains on the target position;
wherein the step of establishing a target position through an object independent association between a location of the camera and the target object comprises:
aiming the camera at a first point on the target object when the vehicle is in a first stationary position and storing the camera pointing direction data representative of the first stationary position;
moving the vehicle to a second stationary position and aiming the camera at the first point on the target object and storing camera pointing direction data representative of the secondary stationary position and movement data representative of the movement from the first stationary position to the second stationary position; and
establishing the first point as the target position based on a comparison of the camera pointing direction data representative of the first stationary position, the camera pointing direction data representative of the second stationary position and the movement data representative of the movement from the first stationary position to the second stationary position.

* * * * *